Patented Apr. 27, 1948

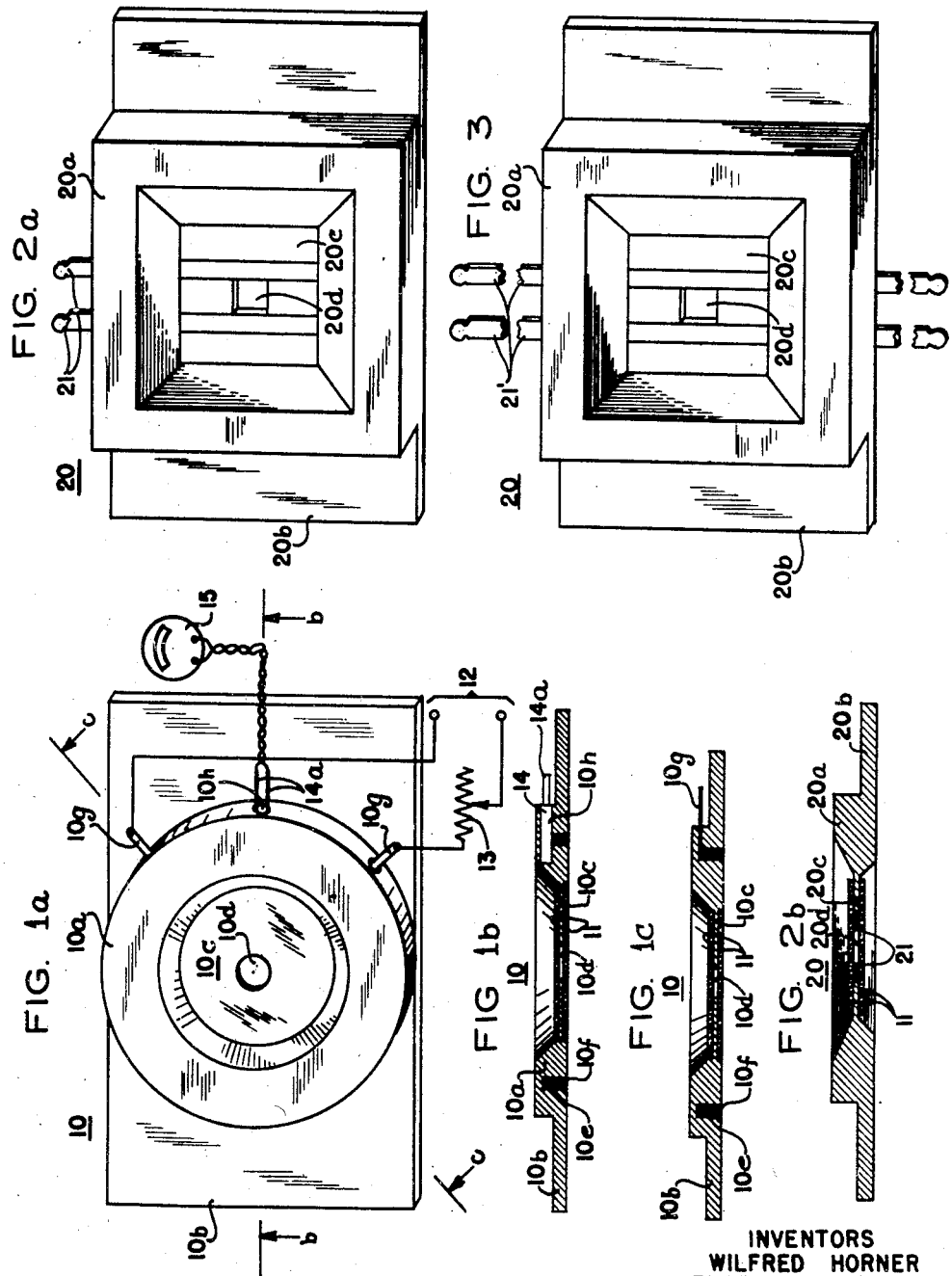

2,440,472

UNITED STATES PATENT OFFICE 2,440,472

STAGE INCUBATOR FOR MICROSCOPES

Wilfred Horner and Eugene Wesselman, Chicago, Ill., assignors, by mesne assignments, to Belmont Radio Corporation, Chicago, Ill., a corporation of Illinois Application September 11, 1944, Serial No. 553,661

5 Claims. (Cl. 88—40)

This invention relates to stage incubators for microscopes and more particularly to such stage incubators by means of which a small and precisely predetermined volume of culture medium may be subjected, while in the microscope, to closely controlled variable conditions affecting development of the culture, for example, a variable temperature, a variable electro-magnetic or electrostatic field, or a combination of these or different conditions.

It is often desirable in the microscopic investigation of the growth of bacteria, simple cellular organisms and like cultures in a medium, to be able to determine accurately the rate of propagation. This may be done by counting, from time to time, the number of units present in a precisely determined volume of the medium, preferably sufficiently small to permit counting directly or by dilution in a known volume and subsequent division and counting the number of units in a given fraction of the original volume. It is also often desirable to be able accurately to control various conditions in the region of the culture affecting its development, for example, its temperature, the magnitude of an electromagnetic field or an electrostatic field, or a combination of these or other conditions. No apparatus is at present available for securing these results and the present invention is directed to a stage incubator by means of which such results may be obtained.

It is an object of the invention, therefore, to provide a new and improved stage incubator for microscopes having one or more of the advantageous characteristics described.

It is another object of the invention to provide a new and improved stage incubator for microscopes by means of which a small and precisely predetermined volume of culture medium may be segregated for observation under the microscope.

It is a further object of the invention to provide a new and improved stage incubator for microscopes including means for developing a closely controlled variable condition in the region of the culture affecting its development, for example, its temperature, the magnitude of an electromagnetic field or an electrostatic field, or a combination of these or other conditions.

In accordance with the invention, a culture medium stage incubator for microscopes comprises a base member having a configuration for mounting in a microscope and including a central web having parallel faces and a small precisely dimensioned aperture in the web adapted to be closed by transparent covers, such as cover glasses, engaging the faces of the web to form a container for a culture medium to be examined.

Further in accordance with the invention, a culture medium stage incubator for microscopes comprises a base member having a configuration for mounting on a microscope and including a central web and an aperture in the web adapted to be closed by at least one transparent cover engaging a face of the web to form a container for a culture medium to be examined. The incubator also includes means for developing in the region of the aperture a variable condition affecting the culture development.

For a better understanding of the invention, together with other and further objects thereof, reference is had to the following description taken in connection with the accompanying drawings while its scope will be pointed out in the appended claims.

Referring now to the drawing, Fig. 1a is a perspective view, while Figs. 1b and 1c are cross sectional views, along the lines b—b and c—c of Fig. 1a, of a stage incubator for microscopes embodying the invention and adapted for variations of temperature or of an electromagnetic field in the region of the culture; Fig. 2a is a perspective view and Fig. 2b is a cross sectional view of a modified form of the stage incubator of the invention adapted for the development of a variable electrostatic field in the region of the culture; while Fig. 3 is a perspective view of a further modified form of the invention adapted for the development of combined variable electrostatic and electromagnetic fields in the region of the culture.

Referring now to Figs. 1a, 1b and 1c of the drawing, there is illustrated a culture medium stage incubator for microscopes comprising a base member 10 including a central cylindrical body portion 10a of substantial thickness and an extended flange 10b having a configuration suitable for mounting in a microscope, preferably rectangular, as illustrated. The central body portion 10a has a circular central web portion 10c of reduced thickness, preferably of a thickness only a small fraction of that of the body portion 10a and formed with substantially parallel upper and lower faces. A small precisely dimensioned aperture 10d, preferably circular, is formed in the web 10c and is adapted to be covered by a transparent cover means engaging one or both faces of the web 10c to form a container for the culture medium to be examined or observed in the microscope, transparent cover glasses 11 being illustrated as engaging both top and bottom faces of the web 10c in Fig. 1c.

The stage incubator also includes means disposed within the base member for developing in the region of the aperture 10d a variable condition affecting the culture development; for example, the body portion 10a may be formed with an annular groove 10e surrounding the web portion 10c and the aperture 10d and an electrical winding 10f may be disposed therein and brought out to terminals 10g connected to suitable electrical supply terminals 12 through suitable control means such as an adjustable impedance or resistor 13.

In case it is desired to develop an elevated temperature at aperture 10d, the winding 10f is preferably formed of high-resistance wire wound in a non-inductive fashion, for example, a bifilar winding, effective to heat the body portion 10a and the web 10c and develop the desired elevated temperature at aperture 10d. On the other hand, if it is desired to observe the effects of an electromagnetic field on the culture medium in aperture 10d, the winding 10f is formed of a low-resistance conductor and wound in the usual inductive fashion.

The body portion 10a is preferably provided with a recess 10h adapted to receive a temperature-responsive element such as a thermometer or, as illustrated, a thermocouple 14 provided with terminals 14a which may be connected to a suitable meter 15 for giving an indication of the temperature of the body portion 10a, which will closely approximate that at the aperture 10d.

It is believed that the operation of the stage incubator will be apparent from the foregoing description. Briefly, the base member 10 is disposed in the microscope and positioned by the flange portion 10b and a glass cover plate 11 is disposed to engage the lower face of the web portion 10c, preferably being of such a thickness that its lower face lies flush with that of the base member 10. A small and known volume of culture medium is deposited in the aperture 10d and a second cover plate 11 is then disposed on the upper face of the web 10c and closely engages this face so that any excess of culture medium deposited in the aperture 10d is squeezed out and a small, precisely predetermined volume of culture medium is left in the aperture 10d.

The medium in aperture 10d can then be inspected and observed in the microscope, usually being illuminated from beneath, and the course of development or change in the culture medium observed. Also the development of the culture under varying degrees of temperature or under varying magnetic fields can be observed by selecting the appropriate winding 10f and controlling energization thereof from the supply terminals 12 by means of the adjustable resistor 13. In case the temperature of the medium is an important factor in the observations being made, the relatively large mass of the body portion 10a imparts a temperature-stabilizing effect due to its thermal inertia or heat-storage capacity; at the same time, the reduced cross-sectional area of the flange 10b minimizes the conduction of heat to and from the body portion 10a and, thus, the effects of extraneous heat sources on the body portion and on the medium under observation. It will be apparent that the effects of either a unidirectional or an alternating electromagnetic field may be observed by connecting the terminals 12 to the appropriate source.

The base member 10 is preferably formed of a non-corrosive material which may be readily cleaned and sterilized at high temperatures with or without the use of antiseptic substances. A nickel-chromium-iron alloy, or a copper-nickel alloy, which is commercially available, has been found particularly suitable for this purpose. On the other hand, in certain installations it may be desirable to form the base member 10 of a plastic or resin material. In case a transparent plastic is used, the lower cover glass may be replaced by a portion of similar configuration forming an integral part of the base member. Similarly, the cover glasses 11 may be made of suitable transparent plastic material.

In case it is desired to observe the development of the culture under the influence of an electrostatic field, the construction of Figs. 1a, 1b and 1c may be modified to that of Figs. 2a and 2b, in which the base member 20 comprises a square central body portion 20a of substantial thickness, with an extending flange portion 20b of rectangular configuration suitable for mounting in a microscope. The body portion 20a is of a substantial thickness and is provided with a square central web portion 20c having a central precisely dimensioned square aperture 20d, the thickness of the web 20c being only a small fraction of that of the body portion 20a. Disposed on either side of the aperture 20d is a pair of parallel elongated electrodes 21. In this construction, the base member is preferably formed of a plastic, or the like, because of its insulating properties, in which case the electrodes 21 may be embedded in and extended through the body portion 20a. If electrical contact between the electrodes and the culture medium within the aperture is to be avoided, the electrodes 21 may be completely embedded in the body portion 20a and the web 20c or they may be of a thickness equal to the thickness of the web 20c and define opposite sides of the aperture 20d and be insulated with a film of lacquer, varnish or the like.

In case the electrodes 21 are short compared to the wave length of an alternating voltage supplied thereto, or in case a unidirectional voltage is supplied thereto, they are effective to develop in the region of the aperture 20d an electrostatic field which may be controlled in any suitable manner, such as that described in connection with the arrangement of Fig. 1a to control the intensity of the electromagnetic field at aperture 10d.

In case it is desired to investigate the effects of combined electrostatic and electromagnetic fields, the incubator of Fig. 2a may be modified to the form illustrated in Fig. 3, which is identical to that of Fig. 2a except that the parallel electrodes 21' are considerably longer, preferably projecting through both sides of the body portion 20a. By exciting the electrodes 21' with an alternating-current signal of a frequency the wave length of which is comparable to the length of the electrodes 21', these electrodes simulate an artificial two-wire transmission-line means which develops therebetween in the region including the aperture 20d combined electromagnetic and electrostatic fields. The manner of use of the stage incubators of Figs. 2a and 3 is the same as that described above in connection with the species of Fig. 1a.

Thus, it is seen that by the constructions described above there is provided a small, compact stage incubator with a small container of a precisely predetermined volume for reception of the culture medium. At the same time, the development of the culture medium may be readily observed under various conditions affecting its development by means of the arrangements for developing in the region of the aperture various culture-affecting conditions.

While the stage incubator of the invention may take various forms and be constructed in various dimensions, there follows the principal dimensions of a stage incubator of the type illustrated in Fig. 1a, which has been found to be satisfactory in practice:

| | | |
|---|---|---|
| Flange portion 10b | millimeters | 50 x 78 |
| Thickness | do | 2 |
| Central body portion: | | |
|    Diameter | do | 50 |
|    Thickness | do | 5 |
| Central web portion: | | |
|    Diameter | do | 25 |
|    Thickness | do | 0.50 |
| Aperture diameter | do | 5 |
| Volume | cubic millimeters | 9.8 |

While there have been described what are at present considered to be the preferred embodiments of the invention, it will be apparent to those skilled in the art that various changes and modifications may be made therein without departing from the spirit or scope of the invention.

What is claimed as new is:

1. A culture medium stage incubator for microscopes comprising, a base member having a configuration for mounting in a microscope and including a central web, an aperture in said web adapted to be closed by at least one transparent cover engaging a face of said web to form a container of accurately predetermined volume for a culture medium to be examined, and an electrical winding disposed in said base member and surrounding said aperture for developing therein a culture-affecting condition.

2. A culture medium stage incubator for microscopes comprising, a base member having a configuration for mounting in a microscope and including a central web, an aperture in said web adapted to be closed by at least one transparent cover engaging a face of said web to form a container of accurately predetermined volume for a culture medium to be examined, and an electrical winding disposed in said base member and surrounding said aperture for developing therein an elevated temperature.

3. A culture medium stage incubator for microscopes comprising, a base member including a central body portion of substantial thickness and mass having a central web and an extended flange of reduced thickness and having a configuration for mounting in a microscope, an aperture in said web adapted to be closed by at least one transparent cover engaging a face of said web to form a container of accurately predetermined volume for a culture medium to be examined, and an electrical winding disposed in said base member and surrounding said aperture for developing therein an elevated temperature, the mass of said body portion and the reduced section of said flange imparting thermal stability to said body portion.

4. A culture medium stage incubator for microscopes comprising, a base member having a configuration for mounting in a microscope and including a central web, an aperture in said web adapted to be closed by at least one transparent cover engaging a face of said web to form a container of accurately predetermined volume for a culture medium to be examined, and an electrical winding disposed in said base member and surrounding said aperture for developing therein an electromagnetic field.

5. A culture medium stage incubator for microscopes comprising, a base member including a central cylindrical body portion of substantial thickness and an extended flange having a configuration for mounting in a microscope, said body portion having a central web portion of reduced thickness and substantially parallel faces, and a small precisely dimensioned aperture in said web adapted to be closed by transparent covers engaging the faces of said web to form a container of accurately predetermined volume for a culture medium to be examined, said body portion being formed with an annular groove surrounding said web, and an electrical winding disposed in said groove for developing in the region of said aperture a culture-affecting condition.

WILFRED HORNER.
EUGENE WESSELMAN.

REFERENCES CITED

The following references are of record in the file of this patent:

UNITED STATES PATENTS

| Number | Name | Date |
|---|---|---|
| 1,144,941 | Lidberg | June 29, 1915 |
| 1,144,942 | Lidberg | June 29, 1915 |
| 1,205,838 | Baldwin | Nov. 21, 1916 |
| 1,609,129 | Roberts | Nov. 30, 1926 |
| 1,964,462 | Gastrich | June 26, 1934 |
| 2,048,128 | Logan | July 21, 1936 |
| 2,265,182 | Mestre | Dec. 9, 1941 |
| 2,312,488 | Rowland | Mar. 2, 1943 |
| 2,351,282 | Oliver | June 13, 1944 |

FOREIGN PATENTS

| Number | Country | Date |
|---|---|---|
| 206,995 | Great Britain | Nov. 22, 1923 |